S. L. GOLDMAN.
BEARING CONSTRUCTION.
APPLICATION FILED DEC. 1, 1914.
1,160,592.
Patented Nov. 16, 1915.
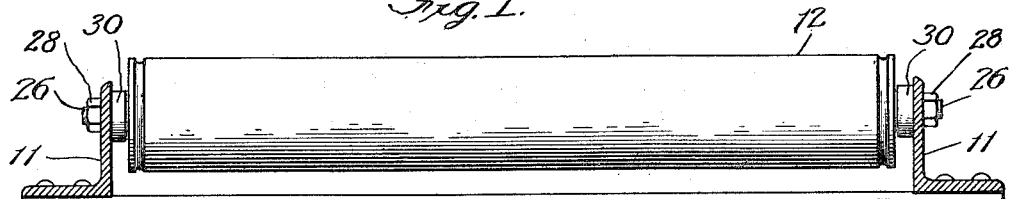
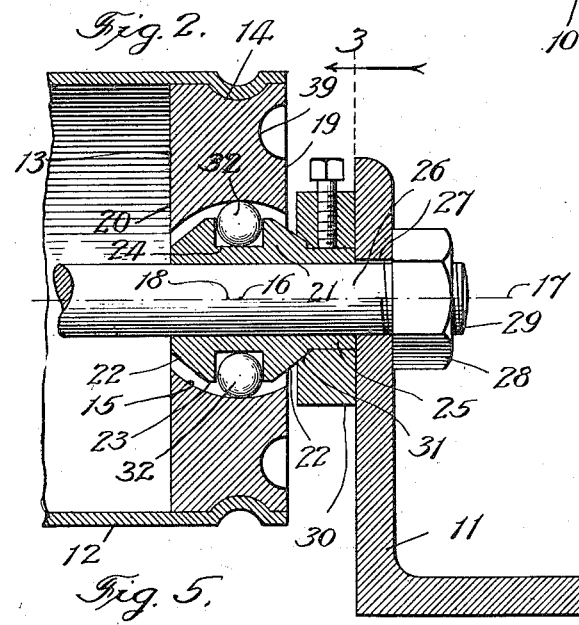
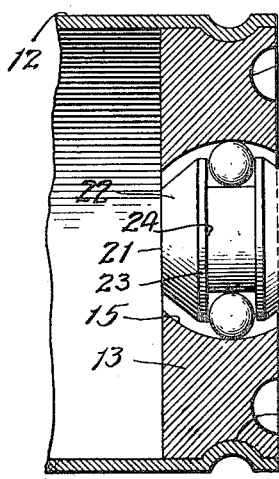
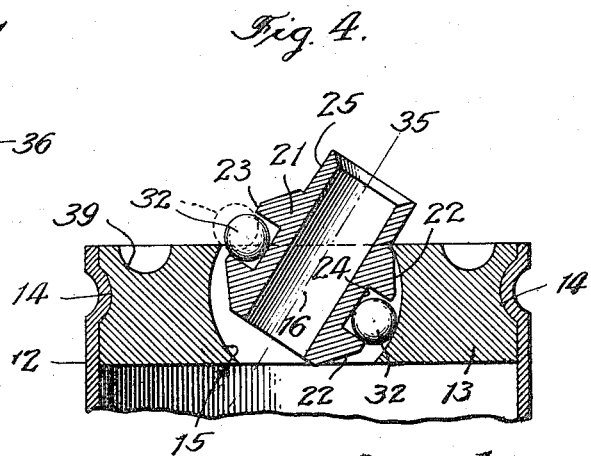
Witnesses:
Inventor
Sigmund L. Goldman,
By Dyrenforth, Lee, Chritton & Wiles
Attys.

UNITED STATES PATENT OFFICE.

SIGMUND L. GOLDMAN, OF CHICAGO, ILLINOIS.

BEARING CONSTRUCTION.

1,160,592.  Specification of Letters Patent.  Patented Nov. 16, 1915.

Application filed December 1, 1914. Serial No. 875,049.

*To all whom it may concern:*

Be it known that I, SIGMUND L. GOLDMAN, a citizen of the United States, residing at 4643 Woodlawn avenue, Chicago, in the county of Cook and State of Illinois, have invented a new and useful Improvement in Bearing Construction, of which the following is a specification.

My invention relates to improvements in conveyers, and more particularly to a construction of bearing designed especially for use in connection with conveyer rolls for gravity conveyers.

The object of the invention is to provide a simple and efficient form of ball-bearing adapted for this service.

Further objects and advantages of the invention will be brought out in connection with the following detailed description of a conveyer roll having a bearing constructed in accordance with the invention.

In the description reference will be had to the accompanying drawings in which—

Figure 1 is a side elevation of a gravity conveyer roll, angle-iron bearing supports being shown in section. Fig. 2 is an enlarged central section through one end of the roll shown in Fig. 1, the shaft being shown in elevation. Fig. 3 is a section on the line 3 of Fig. 2. Fig. 4 is an enlarged section of the roll end and bearing shown in Fig. 2, the shaft being removed and the inner bearing member or cone tilted to show the manner in which the bearing is assembled. Fig. 5 is a central sectional view similar to Fig. 2 but showing a modified construction of the bearing.

Referring more particularly to the drawings, the numeral 10 designates the floor or support which carries the angle-irons 11 in which the conveyer roll 12 is mounted. As best shown in Fig. 2, this roll is preferably constructed as a hollow cylinder closed at each end by the annular ball-race member or cup 13. I prefer to secure the cup within the end of the roll by spinning the metal of the latter into a groove or depression in the outer surface of the cup as indicated at 14. It will be understood, however, that other suitable securing means may be used, it being essential, only, that the cup be held tightly in engagement with the roll.

According to my construction the bearing surface of the cup 13 is a spherical surface, designated 15. The geometrical center of this spherical surface lies on the axis of the cone or outer ball-race member 13, but is displaced axially from the geometrical center of the cup so as to lie nearer to one face thereof than it lies to the opposite face.

The center of the spherical bearing surface 15, shown in Fig. 2, is designated by the point 16 which, as will be seen, lies on the axis 17 of the cup 13, but is displaced outwardly from the geometrical center 18 of the cup so as to lie nearer the outer face 19 than to the inner face 20. The result of this axial displacement is that the spherical bearing surface 15 is unsymmetrical with relation to the cup that is, the opening in the cone is smaller in diameter at the inner face 20 than at the outer face 19.

To coöperate with the cup or outer bearing race member I have described, I have provided a bearing cone or inner race member in the form of a member 21 having beveled or coned ends 22, and a central cylindrical portion 23 machined to form a ball-race or groove 24. In the particular embodiment of the invention shown the ball-race or groove 24 is of rectangular section, but it will be understood that the form of this groove may be varied within wide limits without affecting the operation of the bearing. The outer end of the cone 21 is reduced and extended to form a neck 25, and in the construction shown in Fig. 2 both the neck and the body of the cone are bored to receive the shaft 26 which passes completely through the roll and through both of the end bearings thereof and enters the apertures 27 in the angle-irons 11, being secured in place as by nuts 28 engaging the threaded ends 29 of the shaft 27. Between the inner faces of the angle-irons 11 and the ends of the roll 12 I prefer to insert the annular collars or washers 30 which may be fastened by set screws $30^1$. These washers preferably have their inner faces beveled to provide conical surfaces 31 which bear upon the conical surfaces 22 of the cone 21.

In assembling a conveyer having the rolls thereof provided with my improved bearings, the bearing is first assembled complete within the roll in the following manner: The end of the cone 21 is introduced through the outer aperture of the cup 13; (it will be noted that the outer aperture of the cup is greater in diameter than the cone 21, although the inner aperture of the cup is smaller in diameter than the cone.) The cone having been introduced within the aperture of the cup it is tilted axially at an angle, as shown in Fig. 4, the edge of the neck 25 of the cone resting against the wall of the cup, and suitable bearing balls, designated 32, are introduced, as shown by the dotted line 33 in Fig. 4. It will be noted that in this tilted position of the cone the ball-race or groove therein lies in such a position as to be completely exposed at one point. As each bearing ball 32 is introduced into the groove or ball-race in the cone, it will, by gravity, roll around to the lower point of the race, i. e., to the position shown at $32^1$ in Fig. 4 and in this manner. The ball-race or groove may be completely filled with balls while the parts are in the position shown in Fig. 4. When a sufficient number of balls has been introduced into the ball-race, the cone is tilted to assume its alined position, and in this tilting action the balls 32 and $32^1$ will swing in arcs along the spherical bearing surface of the cup 13 until they reach the position shown in Fig. 2. It will be noted that in Fig. 4 I have shown the geometrical center 35 of the ball-race member 24 as being slightly offset from the center 16 of the spherical bearing surface 15 in the cup. This offsetting is possible by reason of the fact that for my particular purposes I desire that the bearing be somewhat loose, and accordingly the cone is not restricted to an exactly circular or arcuate path in tilting. It will be understood, however, that this offsetting or displacement of the cone with relation to the bearing surface of the cup is not essential to the assembly of my device.
Where the parts are fitted with great accuracy the motion of the cone might be limited to swinging through an arc having its center coincident with the center 16 of the bearing surface 15. Such limitation upon the movement of the cone does not affect the principles of operation of my invention, however, as it is perfectly feasible to assemble the bearing in precisely the manner I have described without displacing the cone from its theoretical center. As stated, however, for the purposes of the practical embodiment of the invention which I have disclosed, I find it convenient to use a loosely fitting bearing in which the displacement of the cone is permissible. The bearings at each end of the roll having been assembled in the manner described, the collars or washers 30 are next applied and the roll introduced and temporarily supported between the angle-irons 11. The shaft 26 may now be introduced and passed through the bores of the two cones, and the securing nuts 27 threaded upon the ends of the shaft. Since the angle-irons 11 have some slight give or flexibility it is possible to adjust the bearings by turning up the nuts 27 on the ends of the shaft. Such screwing up of the end nuts flexes the upstanding portions of the angle-irons inwardly, and by means of the washer 30 the cones 21 are forced inwardly toward one another. I prefer to assemble the device in such a manner that there is about one-sixteenth of an inch clearance between the outer faces 19 of the bearings and the washers 30.

When constructed and assembled in the manner I have just described, my bearing possesses numerous advantages among which the following may be enumerated: The bearing is a true two-piece annular bearing with uninterrupted, continuous, race-ways, both external and internal, for the balls. The bearing is a "full" bearing, that is, it may contain a full complement of balls and no separator or retainer is necessary. This I consider one of the greatest advantages of my construction. The bearing is self-centering, that is, a radial load applied to the roller will cause the same to shift endwise until it automatically assumes the position shown in Fig. 2 in which the balls are in contact with the maximum circumference of the spherical bearing surface 15. If the roll be displaced in either direction from the position shown in Fig. 2 it will, by virtue of the spherical bearing surface, automatically return itself to the proper position. It will be noted also that the form of the bearing is such that it is capable of carrying both radial and axial loads or any combination of these two in any direction. The axial or thrust capacity of the bearing is limited however, as in all other true radial bearings, by the angularity of the raceways which tend to produce wedging, and thereby dangerously overload the bearing. In the preferred construction of my invention I prefer, for this reason, to permit the spacing collars or washers 30 to assume the greater portion of the thrust load. With this in view the bearing is constructed to have sufficient looseness so that the washers 30 abut against the inner-faces of the cups when any great thrust force comes into play. It will be understood in this connection that the plain thrust bearing afforded by the inner faces of the washers 30 might be replaced by any more complicated or expensive thrust bearing, such as a ball or roller. It will be further noted in this connection that the spacing washers or collars 30 which form auxiliary thrust bearings in my construction also serve to protect the bearing from the entrance of foreign matter, that is, serve to make it dirt proof.

It may also be pointed out that the bearing I have described is capable of being used as a brake. Thus, in gravity conveyer service it is frequently desirable to be able to deaden or stop completely the action of some of the rolls in order to retard the motion of the article that is being transported. By merely tightening up the nuts 27 the cones 21 may be forced inwardly until the balls wedge and completely or partially lock the roll. This action, of course, tends to set up great strains in the bearing, and I therefore prefer to provide, as a matter of safety, a collar or washer 30 of sufficient thickness so that the collar itself will bear against and frictionally engage or lock the roll before the bearings have been forced inwardly sufficiently to seriously injure or destroy them.

It will be noted from Fig. 4 that in assembling or disassembling my bearing it is impossible for any of the bearing balls to drop inside of the roll, the cone 21 so closely approaching the bearing surface 15 at all points that it is impossible for a ball to escape from the groove or race-way 24 except at the upper part of the latter where it emerges from the outer face of the cup. In assembling or disassembling a flight of conveyer rolls constructed according to my invention each roll may be handled as a unit, that is, may be placed in its position between the angle-iron supports 11 by merely inserting the shaft 27 endwise. It is therefore possible to remove any roll in the same manner for inspection or repairs without dismantling the flight.

In Fig. 5 I have shown a modified construction of my bearing in which the cone 21, instead of being bored to receive the shaft 27, is formed solid and provided with a threaded extension 36 on which is screwed the securing nut 37. This construction of the bearing is otherwise identical with the form shown in Fig. 2. It may be noted, in connection with this form of the invention, that it is necessary to provide slots, as at 38, in the upstanding portions of the channel sections. The construction shown in Fig. 5 has certain advantages, however, among which may be mentioned the fact that it permits of a considerable disalinement of the cones 21 without affecting the operation of the bearing. This is particularly useful in connection with curved flights of conveyer rolls in which it is difficult to get exact parallelism between the supporting angles 11. With the construction shown in Fig. 5 it is not necessary to attempt to maintain any great degree of accuracy of the angle-irons.

As a further refinement in the actual construction of my bearings I prefer to provide a groove, as shown at 39, in the outer face of each cup. When the bearing is assembled, as will usually be done, in the vertical position, as shown in Fig. 4, a supply of balls may be held in the groove 39 and introduced one at a time into the race-way of the cone.

While I have shown and described the bearing which forms the subject matter of my invention as being applied to a particular service, and have pointed out numerous advantages and refinements of construction which peculiarly adapt it for such service, it will be understood that in its broader aspects I do not regard my invention as being limited to a bearing for this particular purpose, nor to the specific construction of bearing which I have shown and described. I therefore wish it to be understood that while I have shown and described in considerable detail a specific embodiment of my invention, that this showing and description is illustrative only, and that I do not regard my invention as limited to the particular features of construction pointed out, except in so far as such limitations are included within the terms of the following claims in which it is my intention to claim all the novelty inherent in my invention as broadly as the prior art will permit.

What I claim as new and desire to secure by Letters Patent is;—

1. A ball-bearing comprising an outer race-member having a spherical bearing surface, the geometrical center of such surface lying between the face-planes of the said race-member and nearer one face than the other, an inner race-member having a grooved ball-retaining race-way therein, and a plurality of bearing balls confined within said grooved race-way and traveling on a great circle of the said spherical outer "race-member" and serving to lock the same against axial or radial displacement, the parts being so proportioned that a section of the grooved race-way sufficiently large for the insertion of a ball may be exposed at one face of the bearing by axial tilting of the inner race member.

2. A ball-bearing comprising an outer race-member having a spherical bearing surface, the geometrical center of such surface lying between the face-planes of the said race-member and nearer one face thereof than the other, an inner race-member having a grooved ball-retaining race-way therein, and a plurality of bearing balls confined within said grooved race-way and traveling on a great circle of the said spherical outer race-member and serving to lock the same against axial or radial displacement, the parts being so proportioned that axial tilting of the inner race-way member will expose the same at one face of the bearing for the introduction of balls at one point.

3. A ball-bearing comprising an outer race-member having a spherical bearing surface, the geometrical center of such surface lying between the face-planes of the said race-member and nearer to one face thereof than the other, an inner race-member having a grooved ball-retaining race-way therein and a neck extending outward from one face thereof, and a plurality of bearing balls confined within said grooved race-way and traveling on a great circle of the said spherical outer race-member and serving to lock the same against axial or radial displacement, the parts being so proportioned that axial tilting of said inner race member limited by the said neck will expose the groove therein at the opposite face of the bearing for the introduction or removal of balls.

4. A ball-bearing comprising an outer race-member having a spherical bearing surface, the geometrical center of such surface lying between the face planes of the said race-member and nearer to one face than to the other, an inner race-member having a grooved ball-retaining race-way therein, and a plurality of bearing-balls confined within said grooved race-way and traveling on a great circle of the said spherical outer race-member and serving to lock the same against axial or radial displacement, the parts being so proportioned that a section of the grooved race-way sufficiently large for the insertion of a ball may be exposed at one face of the bearing by axial tilting of the inner race-member, and means removably mounted upon said inner race-member for preventing such axial tilting of the said member.

5. A ball-bearing comprising an outer race-member having a spherical bearing surface, the geometrical center of such surface lying between the face planes of the said race-member and nearer to one face thereof than to the other, an inner race-member having a grooved ball-retaining race-way therein and a neck extending outward from one face thereof, a plurality of bearing-balls confined within said grooved race-way and traveling on a great circle of the said spherical outer race-way, and serving to lock the same against axial or radial displacement, the parts being so proportioned that axial tilting of the inner race-member limited by the said neck, will expose the groove therein at one face of the bearing for the introduction or removal of balls, and an annular collar mounted on the said projecting neck and bearing against the face of the said outer race-member, to normally maintain the parts in operative position.

SIGMUND L. GOLDMAN.

In the presence of—
 NELLIE B. DEARBORN,
 JOSEPH SCHWARTZ.